(12) United States Patent
English

(10) Patent No.: US 7,197,490 B1
(45) Date of Patent: Mar. 27, 2007

(54) SYSTEM AND METHOD FOR LAZY-COPY SUB-VOLUME LOAD BALANCING IN A NETWORK ATTACHED STORAGE POOL

(75) Inventor: Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 428 days.

(21) Appl. No.: 10/361,303

(22) Filed: Feb. 10, 2003

(51) Int. Cl.
G06F 17/30 (2006.01)
G06F 7/00 (2006.01)
G06F 17/00 (2006.01)

(52) U.S. Cl. .......... 707/1; 707/204; 707/201; 707/10

(58) Field of Classification Search ........ 707/10, 707/201, 204, 1
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,918,229 A * | 6/1999 | Davis et al. | 707/10 |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,425,035 B2 | 7/2002 | Hoese et al. | |
| 6,772,161 B2 * | 8/2004 | Mahalingam et al. | 707/10 |
| 2002/0112022 A1 * | 8/2002 | Kazar et al. | 709/217 |
| 2003/0115434 A1 * | 6/2003 | Mahalingam et al. | 711/165 |

OTHER PUBLICATIONS

U.S. Appl. No. 10/138,918, Cramer et al.
U.S. Appl. No. 10/027,020, Sen Sarma et al.
U.S. Appl. No. 10/216,453, Rajan et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
David L. Black, Scheduling and Resource Management Techniques for Multiprocessors, Jul. 1990, CMU-CS-90-152.

* cited by examiner

*Primary Examiner*—Etienne P. Leroux
*Assistant Examiner*—Cindy Nguyen
(74) *Attorney, Agent, or Firm*—Cesari & McKenna, LLP

(57) ABSTRACT

A system and method for lazy-copy sub-volume load balancing a networked attached storage pool is provided. The system and method create a qtree on a destination file server and performs a lazy-copy of the data from the source qtree to the sparse volume qtree.

40 Claims, 11 Drawing Sheets

US 7,197,490 B1

SYSTEM AND METHOD FOR LAZY-COPY SUB-VOLUME LOAD BALANCING IN A NETWORK ATTACHED STORAGE POOL

FIELD OF THE INVENTION

The present invention relates file servers and, more particularly to load balancing of file servers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system manages data access and may, in case of a filer, implement file system semantics, such as the Data ONTAP™ storage operating system, implemented as a microkernel, and available from Network Appliance, Inc., of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

In known file server implementations, multiple volumes and/or file servers can be interconnected by a communication media, such as a wide area network. In such network configurations control and ownership of a given volume can be transferred from one file server to another. An example of a method for transferring volume ownership is described in U.S. patent application Ser. No. 10/027,020, entitled SYSTEM AND METHOD FOR TRANSFERRING VOLUME OWNERSHIP IN NETWORK STORAGE, by Joydeep sen Sarma, et al., the teachings of which are hereby incorporated by reference. File servers may transfer the ownership of a given volume to another file server to enable load balancing to occur. Thus, for example, if a given file server is servicing multiple volumes that are being heavily utilized, the file server could transfer the ownership to another file server that has free computational and/or network capabilities. By balancing the load on various file servers in a given network configuration, better performance can be achieved.

However, a noted disadvantage of known file server load balancing systems is that they operate on a volume-by-volume level. It would, thus, be advantageous to operate on a smaller granularity of data, that is, on an organized level that is smaller than a whole volume.

In the example of a WAFL-based file system, there exists a sub-volume unit called a qtree. A qtree, as implemented in the exemplary WAFL-based file system, are subtrees in a volume's file system. A qtree acts similarly to limits enforced on collections of data by the size of a partition in a traditional UNIX® or Windows® file system, but with the flexibility to subsequently change the limit, as qtrees have no connection to a specific range of blocks on a physical disk. Unlike volumes, which are mapped to a particular collection of disks (e.g., RAID groups of n disks) and act more like traditional partitions, a qtrees implemented at a higher level than volumes and can, thus, offer more flexibility. Qtrees are basically an abstraction in the software of the storage operating system executing on a file server that implements the volumes and qtrees. Each volume may, in fact, contain multiple qtrees. In the example of a WAFL-based system, a qtree is a predefined unit that is both administratively visible and externally addressable.

In known load balancing techniques, after a decision is made to migrate a particular qtree or volume from one file server to another, the contents of the qtree or other sub-volume unit must be copied to a storage device owned or controlled by the receiving file server. A noted disadvantage of such requirements is that for large qtrees or other units, a substantial amount of processing or network bandwidth is required to effectuate the transfer. Additionally, during the transfer of data from the source to the receiving file server, clients may be unable to access the data.

Some known file systems contain the capability to generate a snapshot of the file system. In the example of a WAFL-based file system, snapshots are described in *TR*3002 *File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

A snapshot is a restorable version of a file system created at a predetermined point in time. Snapshots are generally created on some regular schedule. The snapshot is stored on-disk along with the active file system, and is called into the buffer cache of the filer memory as requested by the storage operating system. An exemplary file system inode structure 100 is shown in FIG. 1. The inode for an inode file 105 contains information describing the inode file associated with a given file system. In this exemplary file system inode structure the inode for the inode file 105 contains a pointer to an inode file indirect block 110. The inode file, indirect block 110 contains a set of pointers to inodes 117, which in turn contain pointers to indirect blocks 119. The indirect blocks 119 include pointers to file data blocks 120A, 120B and 120C. Each of the file data blocks 120(A–C) is capable of storing, in the illustrative embodiment, 4 kilobytes (KB) of data.

When the file system generates a snapshot of a given file system, a snapshot inode is generated as shown in FIG. 2. The snapshot inode 205 is, in essence, a duplicate copy of the inode for the inode file 105 of the file system 100. Thus, the exemplary file system structure 200 includes the inode file indirect blocks 110, inodes 117, indirect blocks 119 and file data blocks 120A–C as in FIG. 1. When a user modifies a file data block, the file system layer writes the new data block to disk and changes the active file system to point to the newly created block.

FIG. 3 shows an exemplary inode-file system structure 300 after a file data block has been modified. In this illustrative example, file data block 120C was modified to file data block 120C'. When file data block 120C is modified to file data block 120C', the contents of the modified file data block are written to a new location on disk as a function of the exemplary WAFL file system. Because of this new location, the indirect block 319 must be rewritten. Due to this changed indirect block 319, the inode 317 must be rewritten. Similarly, the inode file indirect block 310 and the inode for the inode file 305 must be rewritten. Thus, after a file data block has been modified the snapshot inode 205 contains a pointer to the original inode file indirect block 110 which in turn contains pointers through the inode 117 and an indirect block 119 to the original file data blocks 120A, 120B and 120C. However, the newly written indirect block 319 includes pointers to unmodified file data blocks 120A and 120B. The indirect block 319 also contains a pointer to the modified file data block 120C' representing the new arrangement of the active file system. A new inode for the inode file 305 is established representing the new structure 300. Note that metadata (not shown) stored in any snapshotted blocks (e.g., 205, 110, and 120C) protects these blocks from being recycled or overwritten until they are released from all snapshots. Thus, while the active file system inode for the inode file 305 points to new blocks 310, 317, 319, 120A, 120B and 120C', the old blocks 205, 110 and 120C are retained until the snapshot is fully released.

After a snapshot has been created and file data blocks modified, the file system layer can reconstruct or "restore" the file system inode structure as it existed at the time of the snapshot by accessing the snapshot inode. By following the pointers contained in the snapshot inode 205 through the inode file indirect block 110 and indirect block 119 to the unmodified file data blocks 120A–C, the file system layer can reconstruct the file system as it existed at the time of creation of the snapshot.

In known load balancing techniques the source file system is rendered read only. The snapshotted file system is then copied to an active file system located on disks that are owned by another file server. One exemplary way to achieve this is to take a snapshot of the file system. This copy is generated by copying each inode and data block from the source snapshot to the target file system. Thus, the snapshot is effectively duplicated into the active file system. However, a noted disadvantage of such a load balancing technique is that each inode or data block of the snapshot needs to be copied before the active file system can be accessed. Such copying, in the case of a large file system, can require a substantial amount of time and processing power. Additionally, the copying procedure will exacerbate the load on the source file server during the copying.

SUMMARY OF THE INVENTION

The disadvantages of the prior art are overcome by providing a system and method for load balancing of a set of interconnected file servers using lazy-copy sub-volume load balancing. Various file system processes associated with the storage operating system executing on a file server monitor the degree of load associated with the file server. If the usage or load of the file server meets certain criteria for a migration of a sub-volume (qtree) from a given file server to another file server, then the storage operating system will initiate the qtree migration.

In an illustrative embodiment, a sparse volume (e.g., a volume that does not have every pointer filled with a valid link, but instead utilizes a backing store in another file system) is created on the target volume to store the qtree to be migrated. Included within this sparse volume is an identifier that alerts the file system where the backing store is for this particular qtree. Additionally, the ownership of the name associated with the qtree is mapped to the new file server. This can be accomplished automatically if an Internet Protocol or other networking address is associated with the sub-volume or can be accomplished via delegation routines in such file protocols as the network File System (NFS) or the Common Internet File System (CIFS).

Once the sparse volume has been generated, any write operations will be directed to the sparse volume. Data is then read from the original volume whenever a read operation requests data that has not yet been migrated. In response to a read operation request, the target file server determines if the requested data is located on the sparse volume qtree. If the data is not located on the sparse volume qtree, then the file server will obtain the data through a read request directed at the original source file server. Additionally, a background process can be executing on the recipient file server that copies blocks from the original volume to the sparse volume, thereby completing the transfer of data. Once the entire qtree has been copied to the new location, the snapshot containing the original qtree may be freed and deleted from the active file system of the source file server.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
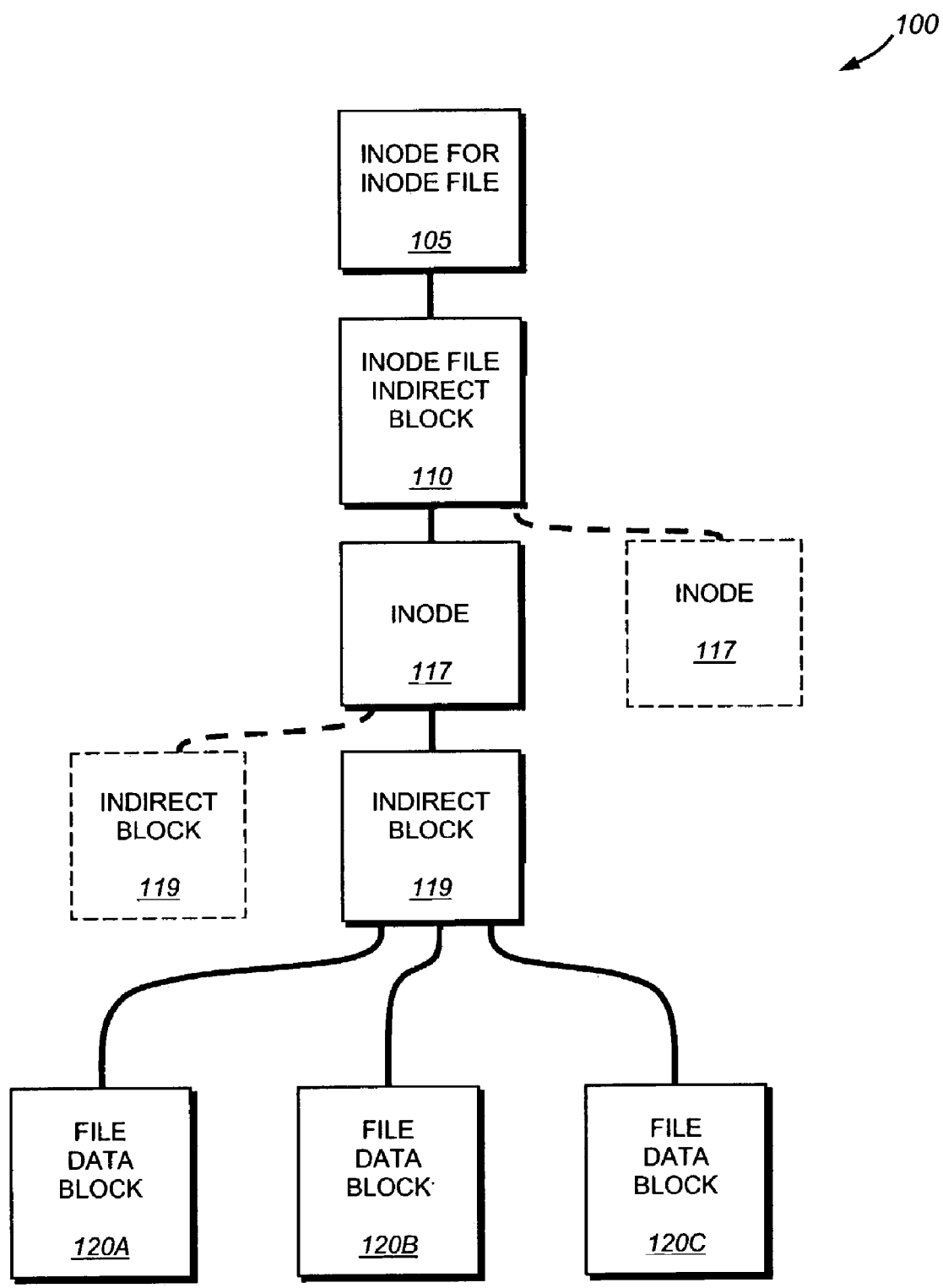
FIG. 1, already described, is a schematic block diagram of an exemplary file system inode structure.
Figure 2:
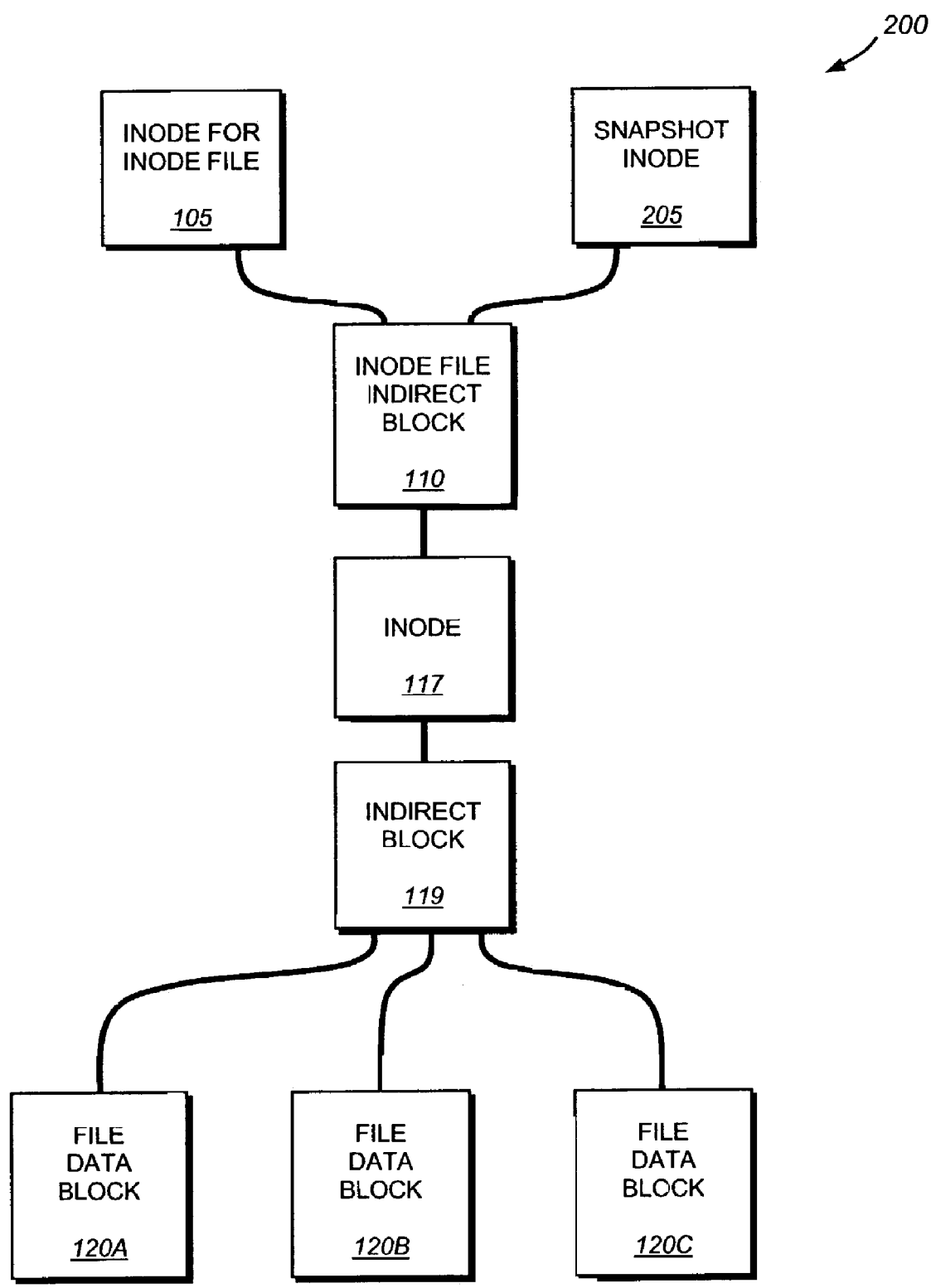
FIG. 2, already described, is a schematic block diagram of the exemplary file system inode structure of FIG. 1 including a snapshot inode.
Figure 3:
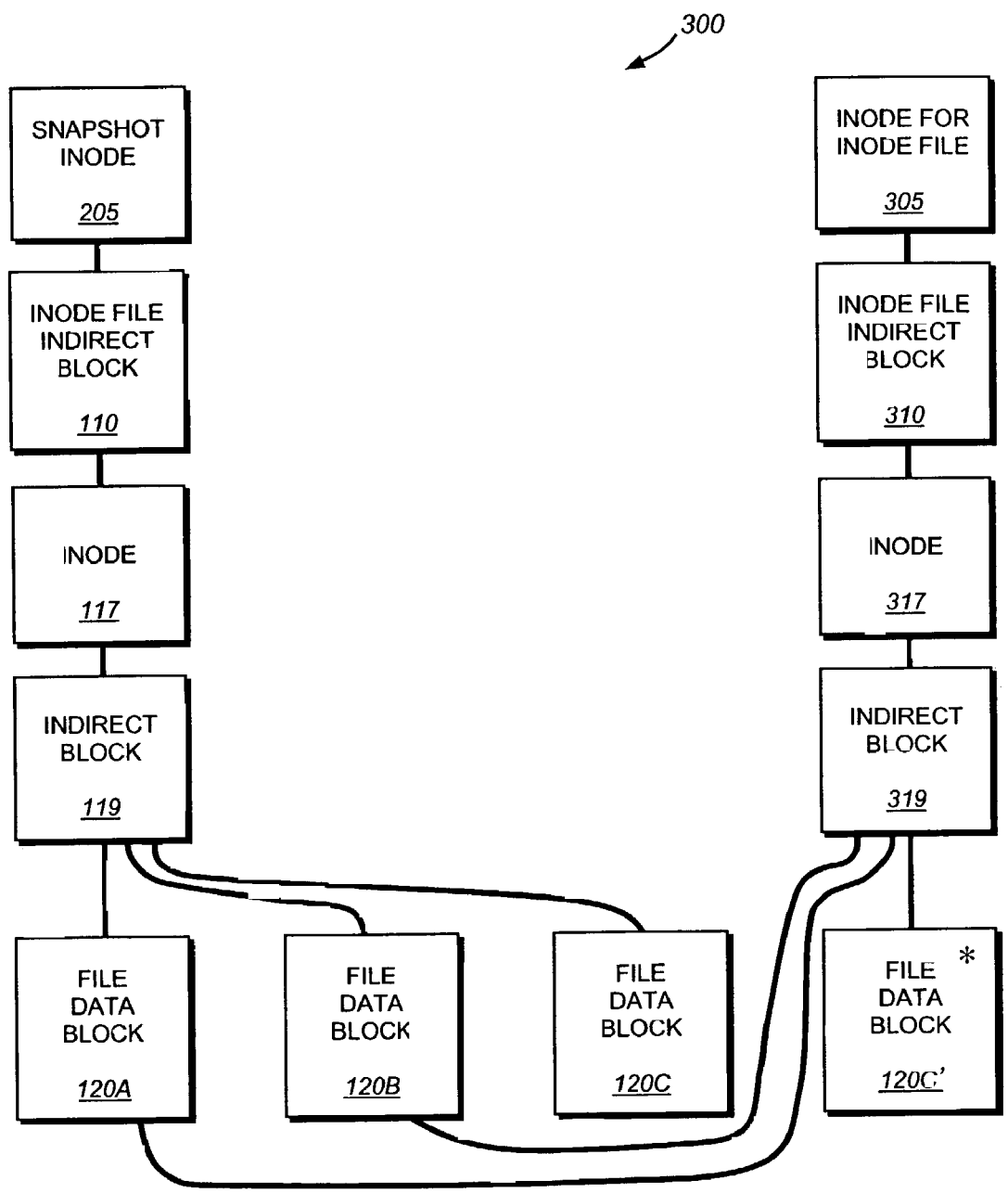
FIG. 3, already described, is a schematic block diagram of an exemplary file system inode structure of FIG. 2 after a data block has been rewritten.
Figure 4:
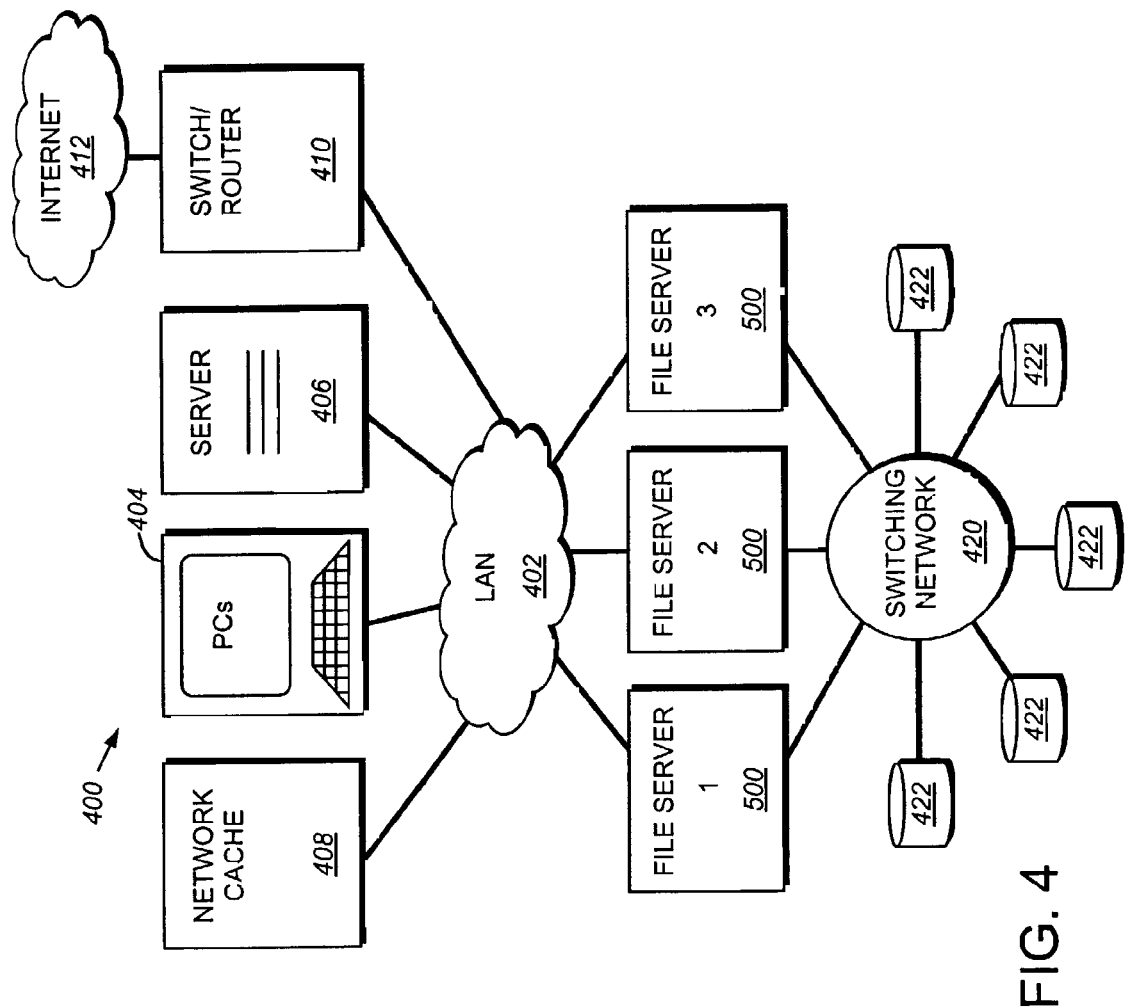
FIG. 4 is a schematic block diagram of an exemplary network environment having various file servers and network-connected clients.

FIG. 4 is a schematic block diagram of an exemplary network environment 400 in which the principles of the present invention are implemented. The environment 400 is based around a local area network (LAN) 402. This LAN can be, in an alternative embodiments a wide area network (WAN), virtual private network (VPN) utilizing communication links over the internet, for example, or a combination of LAN, WAN and VPN implementations. For the purposes of this description, the term LAN should taken broadly to include any acceptable network architecture. The LAN 402 interconnects various clients including, e.g., personal computers 404, servers 406, a network cache 408 or a switch/router 410 that connects to the well-known Internet 412. Also attached to the LAN are file servers 500. These file servers described further below, are configured to control storage of, and access to, data on a set of interconnected storage devices 422. Each of the devices attached to the LAN include an appropriate conventional network interface arrangement (not shown) for communicating over the LAN using desired communication protocols such as the well-known Transport Control Protocol/Internet Protocol (TCP/IP), User Datagram Protocol (UDP), Hyper Text Transport Protocol (HTTP), Simple Network Management Protocol (SNMP), Direct Access File System (DAFS) or Virtual Interface Connections (VI).

B. File Servers

Figure 5:
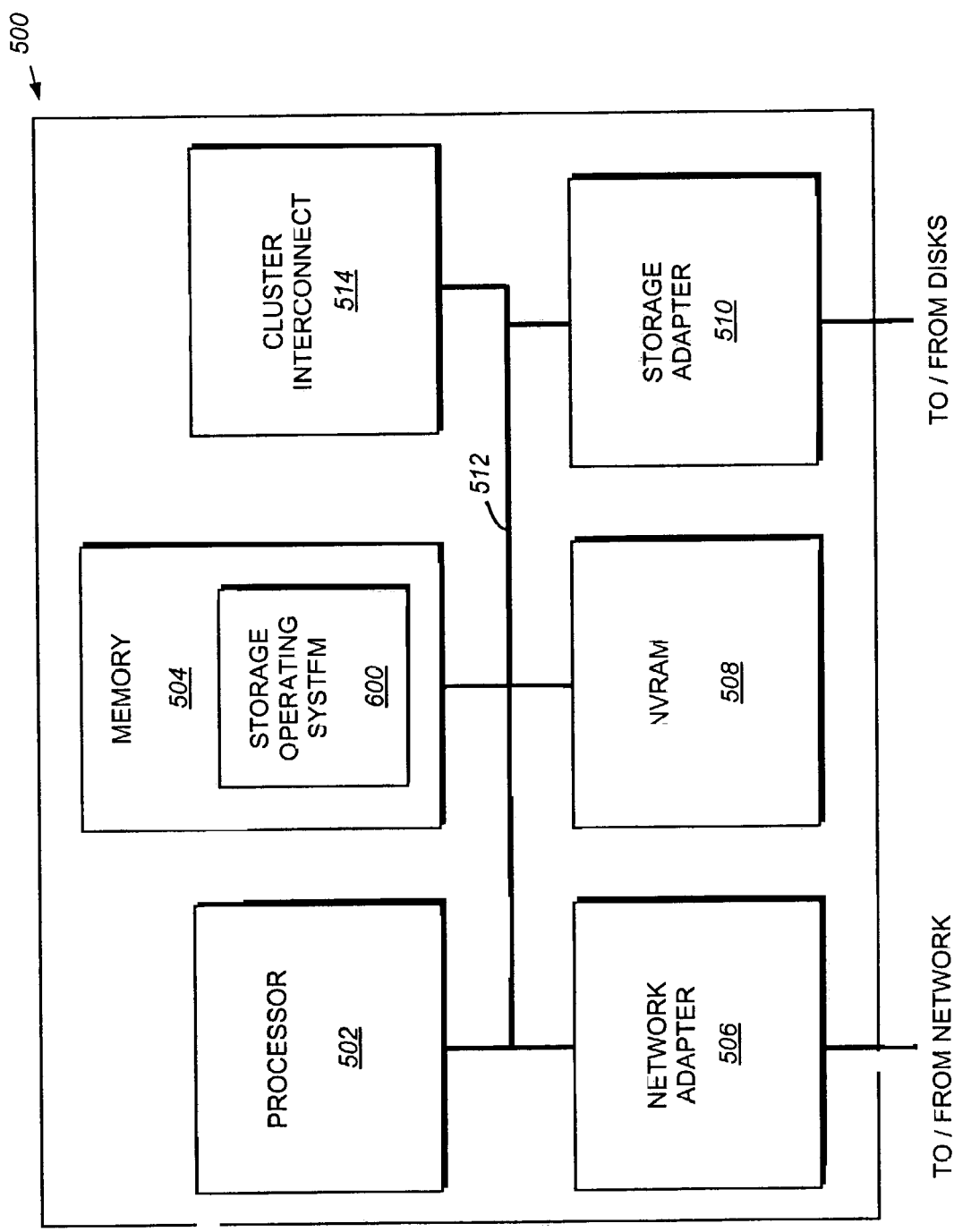
FIG. 5 is a schematic block diagram of an exemplary file server in accordance with an embodiment of this invention.
Figure 6:
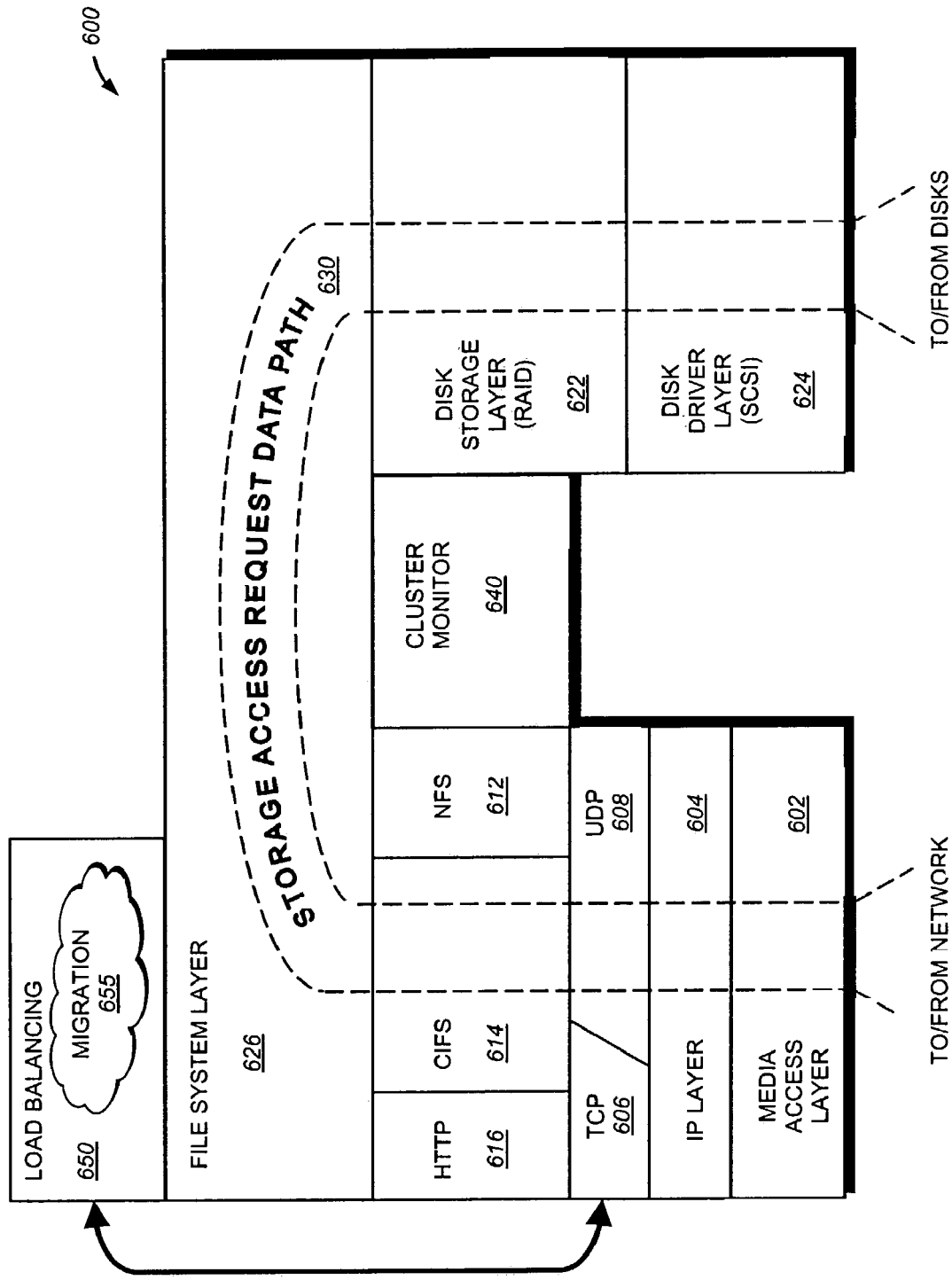
FIG. 6 is a schematic block diagram of an exemplary storage operating system for use in accordance with an embodiment of this invention.

FIG. 5 is a more-detailed schematic block diagram of an exemplary file server 500. By way of background, a file server or filer, is a computer that provides file service relating to the organization of information on storage devices, such as disks. However, it will be understood by those skilled in the art that the inventive concepts described here any may apply to any type of file server, wherever implemented as a special-purpose or general-purpose computer, including a standalone computer.

The file server 500 comprises a processor 502, a memory 504, a network adapter 506, a nonvolatile random access memory (NVRAM) 508 and a the storage adapter 510 interconnected by system bus 512. Contained within the memory 504 is a storage operating system 600 that implements a file system to logically organize the information as a hierarchical structure of directories and files on the disks. In the illustrative embodiment, the memory 504 comprises storage locations that are addressable by the processor and adapters for storing software program code. The operating system 600, portions of which are typically resident in memory and executed by the processing elements, functionally organizes the filer by inter alia, invoking storage operations in support of a file service implemented by the file server.

The network adapter 506 comprises a mechanical, electrical and signaling circuitry needed to connect the file server 500 to client 404 over the LAN 402. The client 404 may be a general-purpose computer configured to execute applications, such as data base applications. Moreover, the client 404 may interact with the filer server 500 in accordance with the client/server model of information delivery. That is, the client may request the services of the file server, and the file server may return the results of the services requested by the client, by exchanging packets defined by an appropriate networking protocol.

The storage adapter 510 incorporates with the storage operating system 300, executing on the file server to access information requested by the client. The storage adapter 510 includes input/output (I/O) interface circuitry that couples to the disks over in I/O interconnect arrangement, such as a conventional high-performance Fibre Channel serial link topology. The information is retrieved by the storage adapter and, if necessary, processed by the processor 502 (or the adapter 510 itself) prior to be forwarded over the system bus 512 to the network adapter 506, where information is formatted into appropriate packets and returned to the client 404.

In one exemplary file server implementation, the file server can include a non-volatile random access memory (NVRAM) 508 that provides fault-tolerant backup of data, enabling the integrity of filer server transactions to survive a service interruption based upon a power failure, or other fault. Additionally, a file server 500 may include a cluster interconnect 514 for communicating with another file server in a file server cluster.

C. Storage Operating System

To facilitate the generalized access to the disks 422, the storage operating system 600 implements write-anywhere file system that logically organizes the information as a hierarchical structure of directories and files on the disks. Each "on-disk" file may be implemented as a set of disks blocks configured to distort information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 602 of network drivers (e.g., an Ethernet driver). The storage operating system 600 further includes network protocol layers, such as an Internet Protocol (IP) layer 604 and its supporting transport mechanisms, the Transport Control Protocol (TCP) layer 606 and the User Datagram Protocol (UDP) layer 608.

A file system protocol layer provides multi-protocol data access and, to that end, includes support for the Network File System (NFS) protocol 612, the Common Internet File System (CIFS) protocol 614 and the Hyper Text Transfer Protocol (HTTP) 616. In addition, the storage operating system 600 includes a disk storage layer 622 that implements a disk storage protocol, such as a RAID protocol, and a disk driver layer 624 that implements a disk access protocol such as, e.g., a Small Computer System Interface (SCSI) protocol.

Bridging the disk software layers with the network and file system protocol layers is a file system layer 626 of the storage operating system 600. Generally the file system layer 626 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 504. If the information is not in memory, the file system layer 626 indexes into the inode file using the inode number to access an appropriate entry and retrieve a logical volume block number. The file system layer 626 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer. The disk driver accesses the disk block number from volumes and loads the requested data in memory 504 for processing by the filer 500. Upon completion of the request, the filer (and storage operating system) returns a reply, e.g., a conventional acknowledgement packet defined by the CIFS specification, to the client 404 over the network 402.

It should be noted that the storage access request data path 630 through storage operating system layers described above needed to perform data storage access for the client requests received the file server may alternately be implemented in hardware, software or a combination of hardware and software. That is, in an alternative embodiment of this invention, the storage access request data path 630 may be implemented as logic circuitry embodied within a field programmable gate array (FPGA) or in an application specific integrated circuit (ASIC). This type of hardware implementation increases the performance of the file service provided by the file server 500 in response to a file system request issued by a client.

Also included in the storage operating system 300 is a cluster monitor 640 that handles communications over a cluster interconnect (if present) of the file server. The cluster monitoring layer 640 also performs inter file server communication through the use of the cluster interconnect.

Above the file system layer 626 is a load balancing layer 650 that is part of a larger set of management routines (not shown). The load balancing layer 650 includes links both to the file system layer 626 and the transport layer such as the transport control protocol 606 and uniform data protocol 608 layers. The load balancing layer 650 includes routines to determine appropriate times to move volumes or subvolumes from one file server to another in order to maintain a balanced load on the various file servers. Included within the load balancing layer 650 is a migration layer 655 that performs various volume or subvolume migration procedures as described further below.

D. Lazy-Copy Sub-Volume Load Balancing

Figure 7:
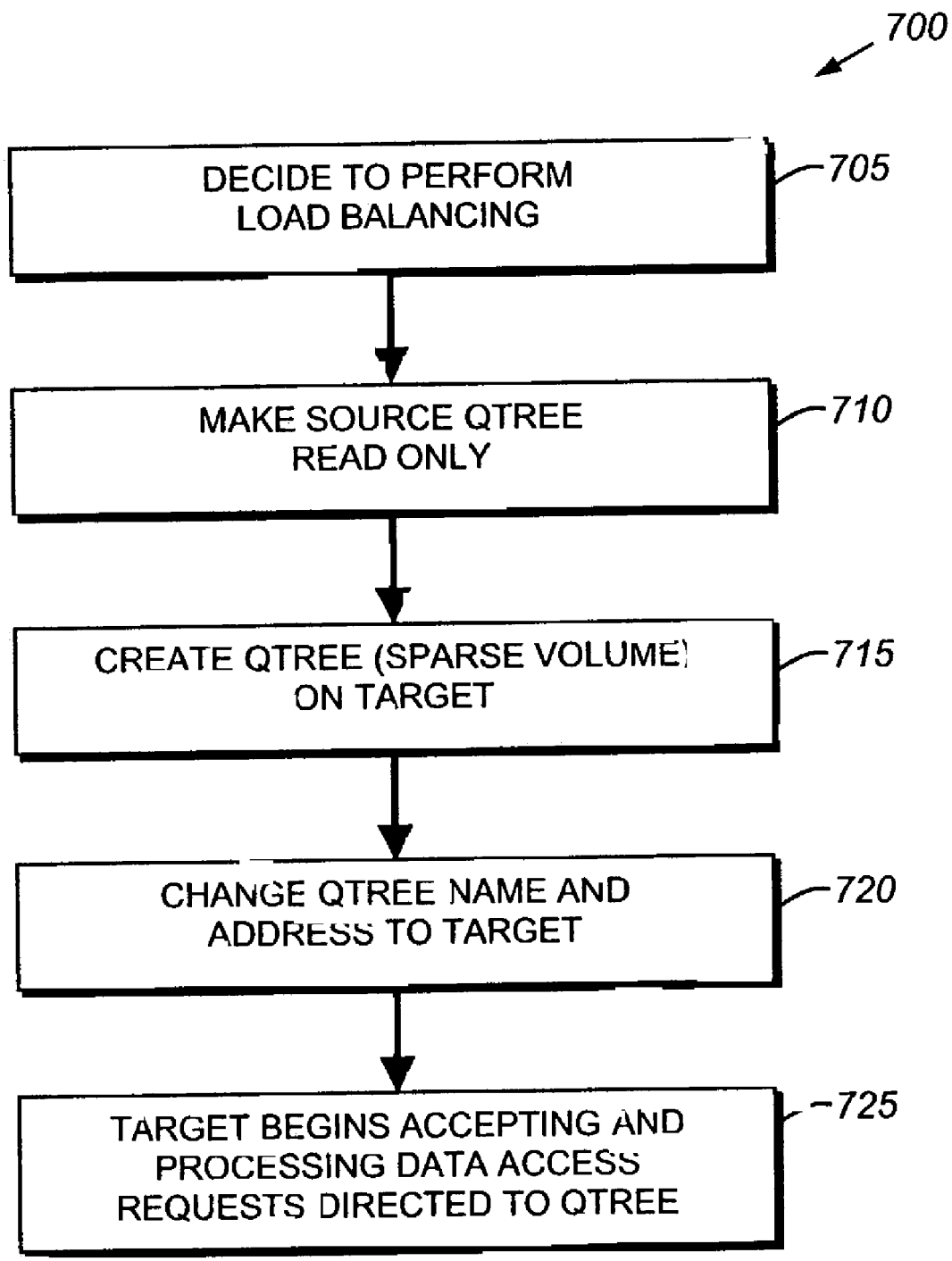
FIG. 7 is a flowchart of a procedure for performing sub-volume load balancing in accordance with an embodiment of the present invention.

The load balancing 650 and migration 655 layers and procedures of the storage operating system 600 enabling lazy copies subvolume load balancing procedure to be performed by a file. By lazy copy it is generally meant a copying process that occurs when the system has unused resources that may be allocated to the copying procedure. The general load balancing procedure 700 is shown in a flow chart in FIG. 7. Initially, in step 705, the load balancing layer 650 will decide to perform a load balancing operation. The decision to perform a load balancing related subvolume migration can be made in accordance with conventional load balancing algorithms. One example of such an algorithm is described in Scheduling and Resource Management Techniques for Multi Processors, July 1990, School of Computer Science, Carnegie Mellon University, by David L. Black, which is hereby incorporated by reference. It should be noted that any load balancing algorithm may be implemented with the teachings of the present invention.

Once the decision has been made to perform a load balancing migration, the source qtree or subvolume unit is made read only on the source file server (step 710). In the example of a WAFL-based file system, this can be accomplished by generating a snapshot of the file system containing the qtree to be migrated. However other methods may be used to make the source qtree be read only including, inter alia, setting appropriate status bits within the file system. It should be noted that qtrees are used for exemplary purposes only. The teachings of the present invention may be utilized with any sub-volume unit, including, for example, individual files or virtual disks. Virtual disks are further described in U.S. patent application Ser. No. 10/216,453 now issued as U.S. Pat. No. 7,107,385, entitled STORAGE VIRTUALIZATION BY LAYERING VIRTUAL DISK OBJECTS ON A FILE SYSTEM, by Vijayan Rajan et al., the contents of which are hereby incorporated by reference. Next, in step 715, a sparse volume is created on the target file server. This sparse volume, described further below, is an empty qtree that is created within a volume that identifies the source qtree as its backing store. Thus, read operations directed to the sparse volume are redirected to the appropriate backing store, i.e., the source qtree.

After the sparse volume has been created, the procedure next, in step 720, changes the qtree name and network address to the target. This step can be accomplish in a variety of ways, depending on how the subvolume is being addressed. In one exemplary embodiment, each subvolume has a unique network address associated with it. In that embodiment, the target file server begins accepting network packets directed to the network address of the associated subvolume. One method of assigning network address to volumes is described in U.S. patent application Ser. No. 10/138,198, entitled SYSTEM AND METHOD FOR ASSOCIATING A NETWORK ADDRESS WITH A STORAGE DEVICE by Samuel M. Cramer, et al, the contents of which are hereby incorporated by reference.

Once the qtree name and address have been moved to the target file server, the target can then begin accepting and processing data access requests directed to the qtree (step 725).

Figure 8:
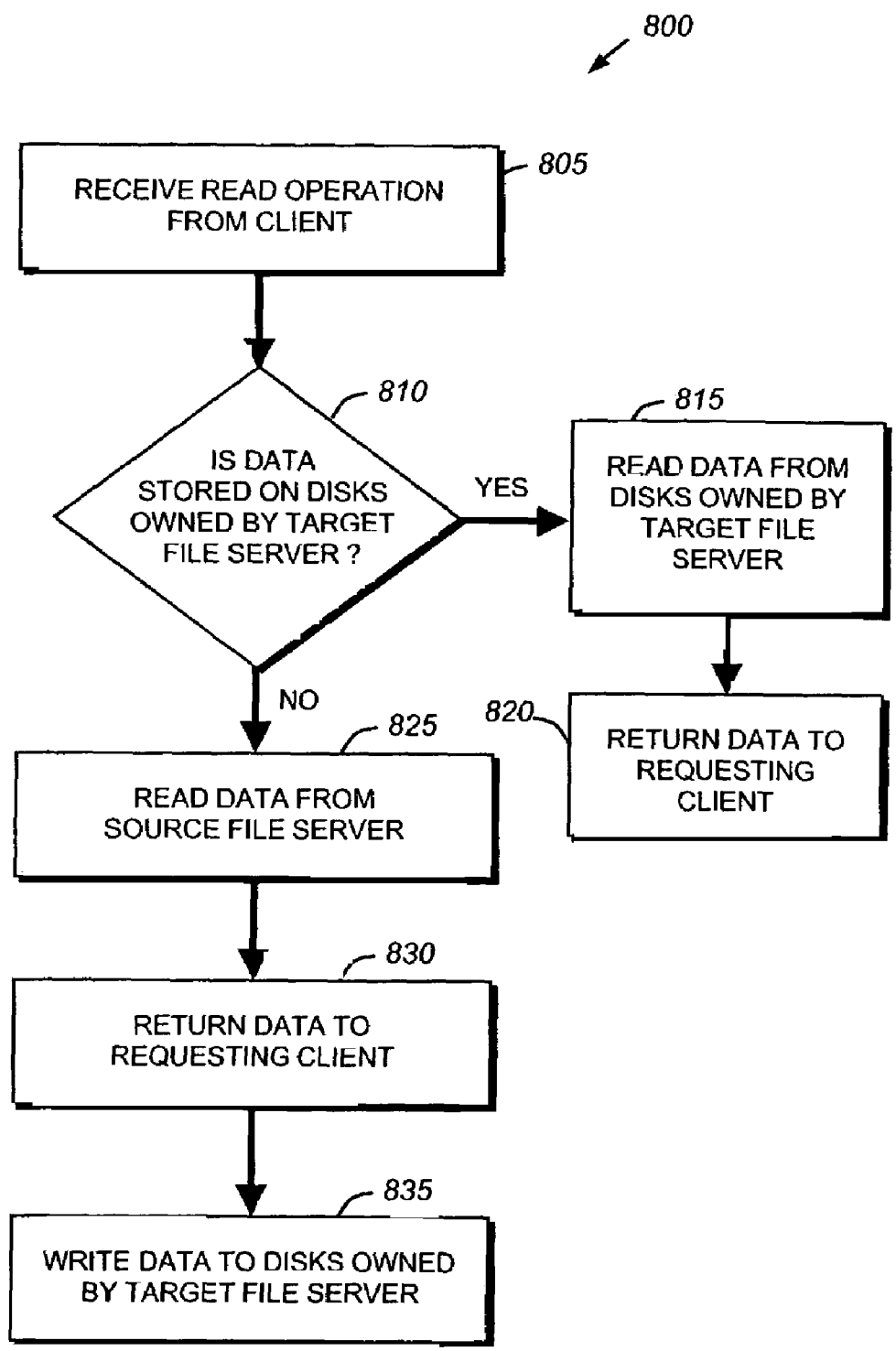
FIG. 8 is a flowchart of a procedure for performing a read operation in accordance with an embodiment of the present invention.

Typically, the data stored on the source qtree must be physically migrated to the target qtree. This is accomplished, in the illustrative embodiment, by the use of a lazy write operation coupled to client read requests. An exemplary procedure 800 is shown as a flowchart in FIG. 8. The target file server receives a read operation from the client (step 805). In response to receiving this read operation, the file server determines if the requested data is stored on disks that are owned by the target file server (i.e., the target qtree) in step 810. If the data is stored on the target qtree, then the procedure reads the data from the target qtree (step 815) and returns the data to the requesting client in step 820.

If the data is not stored on the target qtree, the target file server reads the data from the source file server (step 825). This can be accomplished by, e.g., performing a conventional read operation to the source qtree. In alternate embodiments, the target file server may request the data through a cluster interconnect or other inter-file server communication medium. In another alternate embodiment, the requesting file server may read the data directly from disks using a SAN-interconnect or other shared disk-access mechanism. Once the target file server has obtained the requested data, the data is returned to the requesting client in step 830. Finally, in step 835, the data is also written to the target qtree.

Figure 9:
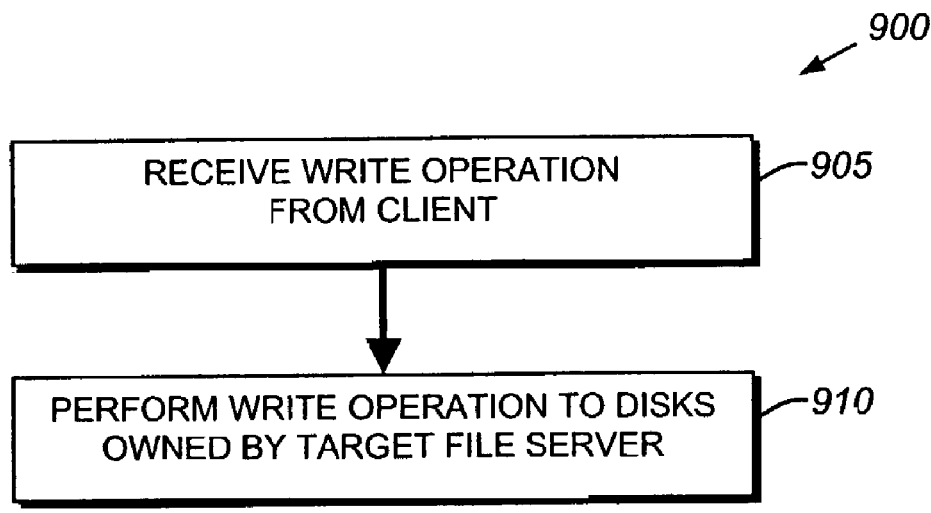
FIG. 9 is a procedure for performing a write operation in accordance with an embodiment of the present invention.

When the target receives a write operation, it performs procedure 900 shown in FIG. 9. Initially, in step 905, the target file server receives a write operation from the client. In response to the write operation, the target file server, in step 910, performs the write operation to disks that are owned by the target file server.

By the use of read and write procedures 800 and 900, respectively, the data contained within the subvolume or qtree that has been migrated is copied to the sparse volume, thereby completing the volume. As data is written to the qtree, it is stored in the new location and, in response to read requests, data is also transferred to the new location. The initial read-load on the source file server will remain the same as files and data are copied to the target through the use of procedure 800.

Figure 10:
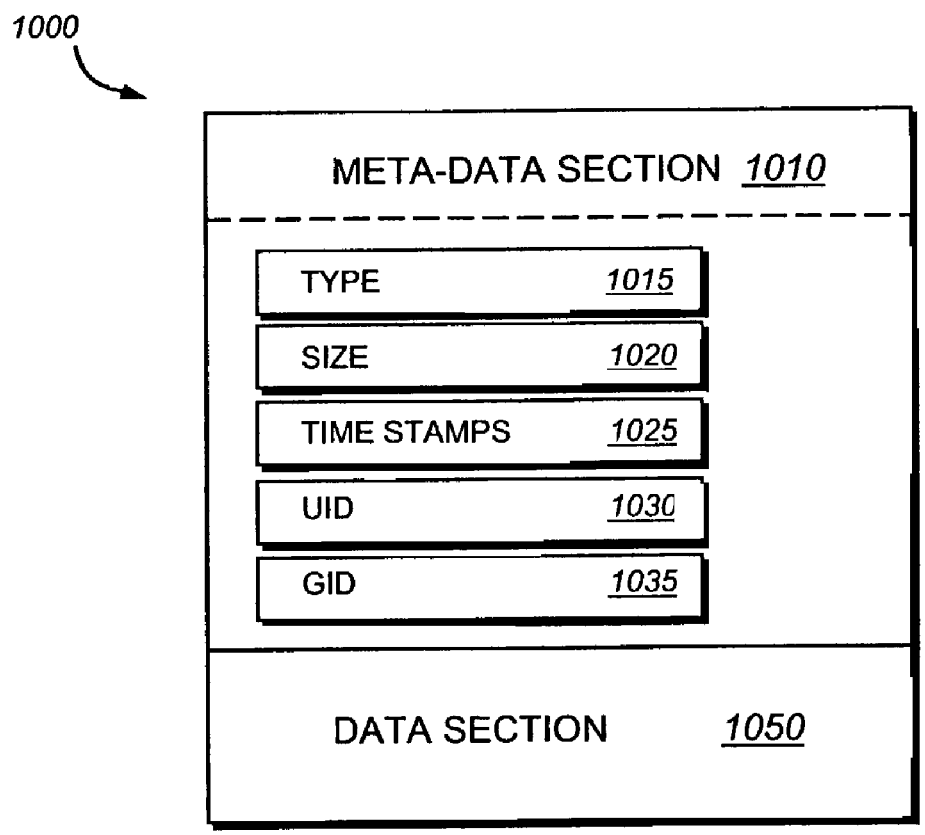
FIG. 10 is a schematic block diagram of an exemplary inode in accordance with an embodiment of the present invention.

FIG. 10 is a schematic block diagram illustrating an on-disk inode 1000, which, in the illustrative embodiment, includes a meta-data section 1010 and a data section 1050. The information stored in the meta-data section 1010 of each inode 1000 describes the file, and such, includes the type (e.g., regular or directory) 1015 of file, the size 1020 of the file, time stamps (e.g., accessed and/or modification) 1025 for the file and ownership, i.e. user identifier (UID 1030) and group identifier (GID 1035) of the file. The contents of the data section 1050 of each inode may be interpreted differently depending upon the type of file (inode) defined within the type field 1015. For example, the data section 1050 of a directory inode contains meta-data controlled by the file system, whereas the data section of a regular inode contains user-defined data. In this latter case, the data section 1050 includes a representation of the data associated with the file.

Specifically, the data section 1050 of a regular on-disk inode may include user data or pointers, the latter referencing four kilobyte data blocks on disk used to store the user data. Each pointer is, in the illustrative embodiment, a logical volume block number to thereby facilitate efficiency among the file system and the disk storage (RAID) layer when accessing the data stored on the disks. Due to the restricted size (128 bytes) of the inode, user data having a size that is less than or equal to 64 bytes is represented in its entirety within the data section of that inode. However, if the user data is greater than 64 bytes the less than or equal to 64 kilobytes, than the data section of the inode comprises up to 16 pointers, each of which references a four kilobyte block of data on the disk. Moreover, if the size of the data is greater than 64 kilobytes but less than or equal to 64 megabytes, than each pointer in the data section 1050 of the inode references an indirect inode that contains 1024 pointers, each of which references a four kilobyte data block on is disk.

In accordance with the present invention, if a given data block is not located on disks owned by the target file server, then the corresponding pointer in data section 1050 of an inode is marked as NOTPRESENT. The file system layer, when reading an inode from disk will search the backing store associated with a given qtree when it encounters an inode or pointer marked as NOTPRESENT.

Figure 11:
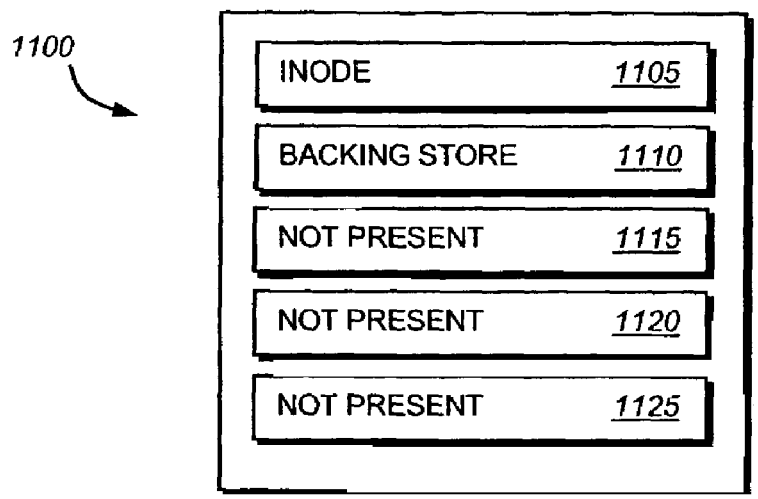
FIG. 11 is a schematic block diagram of an exemplary inode of a sparse sub-volume in accordance with an embodiment of the present invention.
Figure 12:
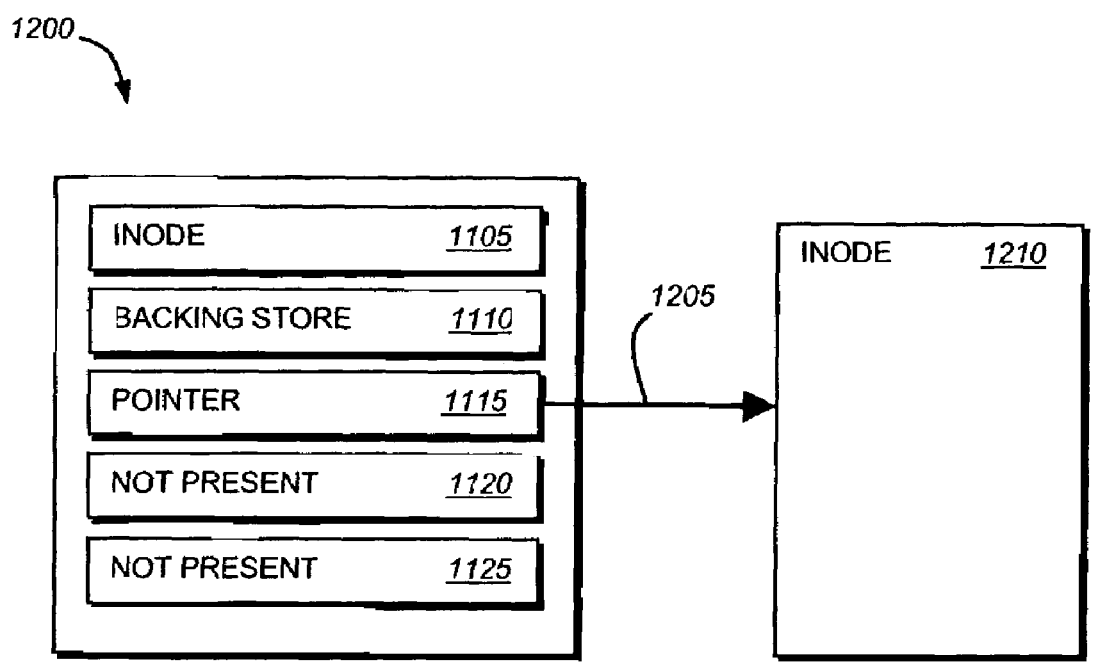
FIG. 12 is a schematic block diagram of an exemplary inode after a write or read operation has occurred in accordance with an embodiment of the present invention.

An exemplary inode 1105 of a sparse qtree is shown in FIG. 11. In this example, inode 1105 has recently been created. The inode 1105 identifies its backing store 1110 associated with the qtree and contains three pointers 1115, 1120 and 1125. Each of the pointers is marked as NOTPRE- SENT as no data has been stored on the target volume yet. If, for example, a write request is directed to replace the data that pointer 1115 identifies, the write procedure as described above will replace the pointer with a pointer directed towards an inode stored on the target file server. An exemplary configuration 1200 is shown in FIG. 12. The inode 1105 includes a modified pointer 1115 that points to (arrow 1205) inode 1210 stored on the target file server.

E. Background Copying

The read/write procedures described above will migrate over time the majority of a sub-volume qtree to the target file server. However, if there are files or inodes that are not accessed by clients, they will not be migrated to the target file server. Because the snapshot acting as the backing store cannot be deleted until the entire qtree has been copied, a potential exists that the snapshot may need to be kept for long periods of time. To avoid this problem, the load balancing layer 650 of the storage operating system 600 includes a set of migration processes 655. One of these processes performs a background copy of the backing store to complete the sparse qtree on the target file server. This process can be activated in numerous ways. For example, an administrator may activate the process through the use of a command in a command line interface or via a graphical user interface to the file server. Alternately, the background copy process could be initiated upon some predetermined event such as, e.g., a certain amount of time elapsing from the time of the creation of the sparse qtree or a lull in activity directed to the qtree.

Figure 13:
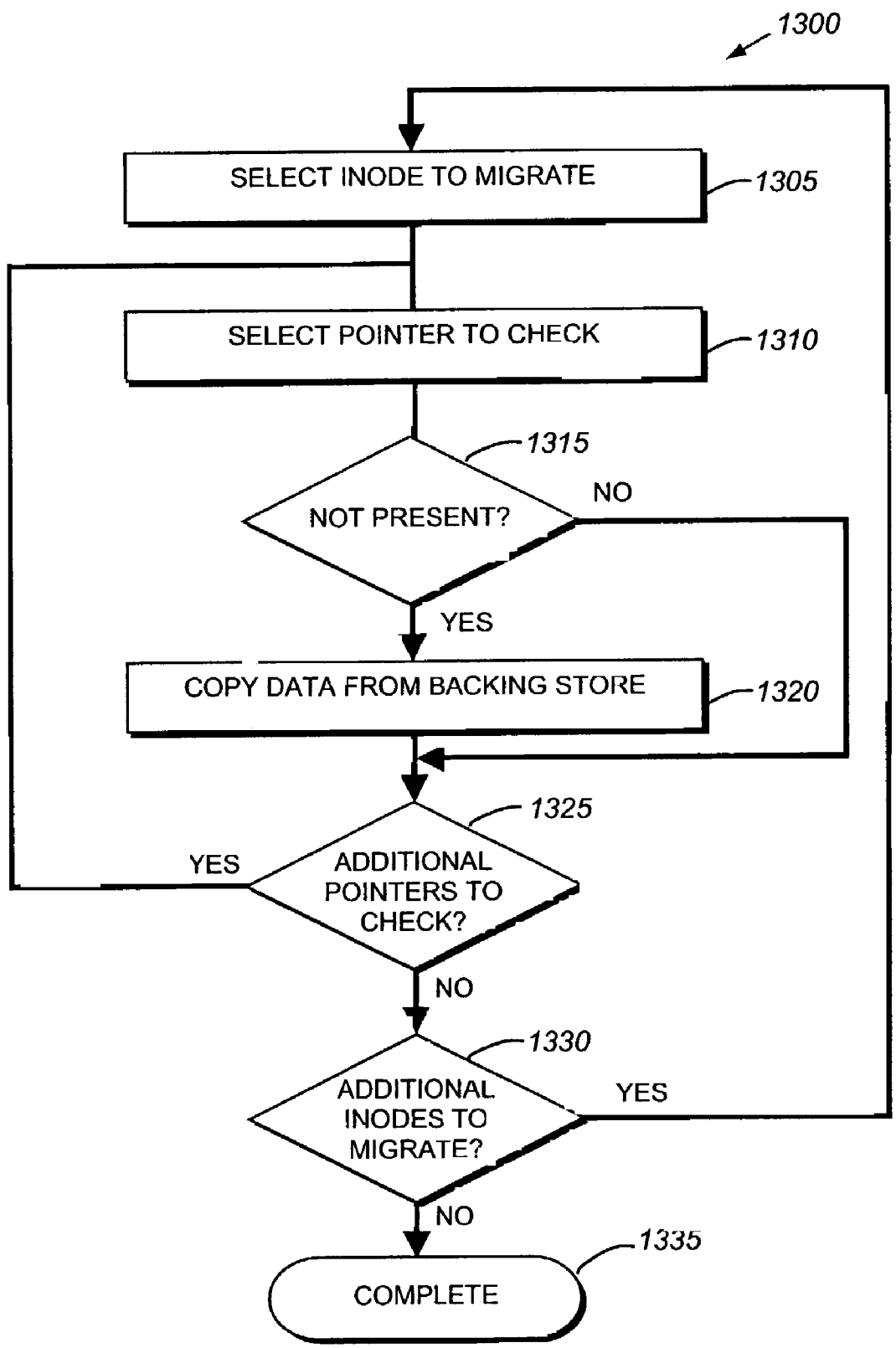
FIG. 13 is a flowchart of a background copy procedure in accordance with an embodiment of the present invention.

An exemplary procedure 1300 for this background copying process is shown in FIG. 13. Initially, in step 1305, the procedure selects an inode to migrate from the target file server. This inode can be selected in any way. In one embodiment, the procedure traverses the various inode trees of the qtree. Once an inode has been selected, the procedure then selects a pointer within the inode to check (step 1310). Then, in step 1315, the procedure determines if the value of the pointer is NOTPRESENT. If the value is not equal to NOTPRESENT, then the pointer points to an inode or block that is stored on the target file server. In such a case, the procedure jumps ahead to step 1325.

If the value of the pointer is NOTPRESENT, then the procedure copies the applicable data from the backing store and writes it to disks owned by the target file server (step 1320). Next, in step 1325, the procedure determines if there any additional pointers to be checked in this inode. If there are, then the procedure loops back to step 1310 to select a new pointer. Otherwise, the procedure then determines, in step 1330, if there additional inodes to be migrated. If there additional inodes the migrate, the procedure loops back to step 1305. Otherwise, the procedure is complete (step 1335) and the backing store is no longer necessary.

To again summarize, when a file server decides to perform a sub-volume load balancing, the target file server generates a sparse sub-volume unit, within a volume controlled by the target. The source file server renders the source sub-volume unit read-only. The sparse sub-volume unit (qtree) includes identification as to a backing store, namely the read-only version of the source sub-volume unit. The name and address of the qtree to be migrated is then transferred from the source to the target file server. After the address is transferred, the target file server begins accepting data access requests directed to the qtree.

The target file server, in response to receiving a read request directed to the sparse qtree, will determine if the data is located on disks controlled by the target. If the data is not on disks controlled by the target, the target file server performs a read operation directed to the source. After reading the information, the target returns the requested information to the client and also write the information to disks owned by the target. All write operations received by the target are directed to target-owned disks.

By utilizing the read/write procedures described above, the load on the source file server decreases over time, while the target file server begins carrying the load previously performed by the source. In response to a predetermined event or time lapse, a background copying process, resident in a load balancing layer of a storage operating system, may be initialized to copy any inodes or data blocks that have not been migrated to the target.

The foregoing has been a detailed description of the illustrative embodiment of the invention. Various modifications and additions can be made without departing from the spirit and scope of the invention. For example, it is understood that the various data structures and inodes can include additional fields and/or be generated or managed by differing layers of a storage operating system while remaining within the scope of the present invention. It should also be understood that the load-balancing technique described herein may be utilized with any sub-volume unit including, e.g., file and vdisks. Additionally, while this description has been written and referenced to file servers and filers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for performing sub-volume load balancing by a file server in a network environment comprising a source volume and a target volume, the method comprising the steps of:

marking a source sub-volume unit as read only;

creating a sparse sub-volume unit on the target volume, wherein the sparse sub-volume is a volume that does not have every pointer filled with a link because the sparse sub-volume uses a backing store on the source volume;

mapping a name and address of the source sub-volume unit from the source volume to the target volume; and accepting, by the target volume, and processing data access requests directed to the sub-volume unit.

2. The method of claim 1 wherein the source sub-volume unit and the sparse sub-volume unit further comprise a qtree.

3. The method of claim 1 wherein the source sub-volume unit and the sparse sub-volume unit further comprise a file.

4. The method of claim 1 wherein the source sub-volume unit and the sparse sub-volume unit further comprise a vdisk.

5. The method of claim 1 wherein the step of marking a source sub-volume unit as read only further comprises the step of generating a persistent consistency point image of the source sub-volume unit.

6. The method of claim 1 wherein the step of creating a sparse sub-volume unit on the target further comprises the steps of:

creating a root inode on the target volume; and setting all pointers in the root inode to a predetermined value, the predetermined value indicating that a-the backing store is associated with the sparse sub-volume.

7. The method of claim 1 wherein the step of mapping further comprises the steps of:
  mapping a network address associated with the source sub-volume unit to the sparse sub-volume unit on the target volume; and
  mapping a name associated with the source sub-volume unit to the sparse sub-volume unit on the target volume.

8. The method of claim 1 wherein the step of accepting, by the target volume, and processing data access requests directed to the sub-volume unit further comprises the steps of:
  performing, in response to receiving a read operation, a read procedure; and
  performing, in response to receiving a write operation, a write operation.

9. The method of claim 8 wherein the read operation further comprises the steps of:
  determining if requested data is stored on the target volume;
  reading, in response to the requested data being stored on the target volume, the requested data and returning it to a requesting client;
  reading, in response to the requested data not being stored on the target volume, the requested data from the source and returning the requested data to the requesting client; and
  writing the requested data to the target volume.

10. The method of claim 8 wherein the write operation further comprises the step of writing requested data to the target, volume.

11. A computer readable medium, including program instructions executing on a computer, for performing sub-volume load balancing in a network environment comprising a source volume and a target volume, the computer readable medium comprising program instructions for performing the steps of:
  marking a source sub-volume unit as read only;
  creating a sparse sub-volume unit on the target volume, wherein the sparse sub-volume is a volume that does not have every pointer filled with a link because the sparse sub-volume uses a backing store on the source volume;
  mapping a name and address of the source sub-volume unit from the source volume to the target volume; and
  accepting, by the target volume, and processing data access requests directed to the sub-volume unit.

12. A storage operating system executing on a server, the storage operating system comprising:
  a load balancing layer for performing sub-volume load balancing by generating a sparse sub-volume on a target volume, wherein the sparse sub-volume is a volume that does not have every pointer filled with a link because the sparse sub-volume uses a backing store on a source volume.

13. The storage operating system of claim 12 wherein the load balancing layer further comprises a set of migration routines for performing a lazy copy of a source sub-volume unit to a sparse target sub-volume unit.

14. An apparatus for performing sub-volume load balancing by a file server in a network environment comprising a source volume and a target volume, the apparatus comprising:
  means for marking a source sub-volume unit as read only;
  means for creating a sparse sub-volume unit on the target volume, wherein the sparse sub-volume is a volume that does not have every pointer filled with a link because the sparse sub-volume uses a backing store on the source volume;
  means for mapping a name and address of the source sub-volume unit from the source volume to the target volume; and
  means for accepting, by the target volume, and processing data access requests directed to the sub-volume unit.

15. The apparatus of claim 14, further comprising: means for using a qtree as the source sub-volume unit and the sparse sub-volume unit.

16. The apparatus of claim 14, further comprising: means for using a file as the source sub-volume unit and the sparse sub-volume unit.

17. The apparatus of claim 14, further comprising: means for using a vdisk as the source sub-volume unit and the sparse sub-volume unit.

18. The apparatus of claim 14, further comprising:
  means for generating a persistent consistency point image of the source sub-volume unit when the source sub-volume is marked read-only.

19. The apparatus of claim 14 wherein the step of creating a sparse sub-volume unit on the target volume further comprises:
  means for creating a root inode on the target, volume; and
  means for setting all pointers in the root inode to a predetermined value, the pre-determined value indicating that a-the backing store is associated with the sparse sub volume.

20. The apparatus of claim 14 wherein the step of mapping further comprises: means for mapping a network address associated with the source sub-volume unit to the sparse sub-volume trait on the target, volume; and
  mapping a name associated with the source sub-volume unit to the sparse sub-volume unit on the target volume.

21. The apparatus of claim 14 wherein the step of accepting, by the target volume, and processing data access requests directed to the sub-volume unit further comprises:
  means for performing, in response to receiving a read operation, a read procedure; and
  means for performing, in response to receiving a write operation, a write operation.

22. The apparatus of claim 21 wherein the read operation further comprises:
  means for determining if requested data is stored on the target volume;
  means for reading, in response to the requested data being stored on the target volume, the requested data and returning it to a requesting client;
  means for reading, in response to the requested data not being stored on the target volume, the requested data from the source volume and returning the requested data to the requesting client; and
  means for writing the requested data to the target volume.

23. The apparatus of claim 21 wherein the write operation further comprises the step of writing requested data to the target, volume.

24. A method for performing sub-volume load balancing in a storage system, comprising:
  selecting a source sub-volume unit on a source server;
  marking the source sub-volume unit as read only;
  creating a sparse sub-volume unit on a target server, wherein the sparse sub-volume is a volume that does not have every pointer filled with a link because the sparse sub-volume uses a backing store on the source server;

mapping a name and address of the source sub-volume unit from the source server to the target server; and accepting, by the target server, and processing data access requests directed to the source sub-volume unit.

25. The method of claim 24 wherein the source sub-volume unit and the sparse sub-volume unit further comprise a qtree.

26. The method of claim 24 wherein the source sub-volume unit and the sparse sub-volume unit further comprise a file.

27. The method of claim 24 wherein the source sub-volume unit and the sparse sub-volume unit further comprise a vdisk.

28. The method of claim 24 wherein the step of marking a source sub-volume unit as read only further comprises the step of generating a persistent consistency point image of the source sub-volume unit.

29. The method of claim 24 wherein the step of creating a sparse sub-volume unit on the target further comprises the steps of:
    creating a root inode on the target server; and
    setting all pointers in the root inode to a predetermined value, the predetermined value indicating that the backing store is associated with the sparse sub-volume.

30. The method of claim 24 wherein the step of mapping further comprises the steps of:
    mapping a network address associated with the source sub-volume unit to the sparse sub-volume unit on the target server; and
    mapping a name associated with the source sub-volume unit to the sparse sub-volume unit on the target server.

31. The method of claim 24 wherein the step of accepting, by the target server,
    and processing data access requests directed to the sub-volume unit further comprises the steps of:
        performing, in response to receiving a read operation, a read procedure; and
        performing, in response to receiving a write operation, a write operation.

32. The method of claim 31 wherein the read operation further comprises the steps of:
    determining if requested data is stored on the target server;
    reading, in response to the requested data being stored on the target server, the requested data and returning it to a requesting client;
    reading, in response to the requested data not being stored on the target server, the requested data from the source and returning the requested data to the requesting client;
    writing the requested data to the target server.

33. The method of claim 31 wherein the write operation further comprises the step of writing requested data to the target server.

34. A storage system for performing sub-volume load balancing, comprising:
    a source server configured with a source server operating system, the source server operating system configured to mark a source sub-volume unit as read only; and
    a target server configured with a target server operating system, the target server operating system configured to create a sparse sub-volume unit, wherein the sparse sub-volume is a volume that does not have every pointer filled with a link because the sparse sub-volume uses a backing store on the source server.

35. The storage system of claim 34, wherein the target server operating system is further configured to map a name and address of the source sub-volume unit from the source server to the target server.

36. The storage system of claim 34, further comprising:
    a network interface card on the target server to accept data access requests directed to the source sub-volume unit.

37. The storage system of claim 34, wherein the target server operating system is further configured to process data access requests directed to the source sub-volume unit.

38. The storage system of claim 34, wherein the source sub-volume unit and the sparse sub-volume unit further comprise a qtree.

39. The storage system of claim 34, wherein the source sub-volume unit and the sparse sub-volume unit further comprise a file.

40. The storage system of claim 34, wherein the source sub-volume unit and the sparse sub-volume unit further comprise a vdisk.

* * * * *